United States Patent [19]

Erbert

[11] Patent Number: 4,727,533

[45] Date of Patent: Feb. 23, 1988

[54] OPTICAL DATA STORAGE AND RETRIEVAL APPARATUS

[75] Inventor: Virgil Erbert, Tijeras, N. Mex.

[73] Assignee: Illuminated Data, Inc., Albuquerque, N. Mex.

[21] Appl. No.: 737,932

[22] Filed: May 28, 1985

Related U.S. Application Data

[63] Continuation-in-part of Ser. No. 575,457, Jan. 30, 1984, abandoned.

[51] Int. Cl.$^4$ .......................... G11B 7/00; G11B 7/24
[52] U.S. Cl. ................... 369/112; 369/111; 369/286; 346/137; 346/135.1; 350/167
[58] Field of Search ............... 369/111, 112, 283, 284, 369/286, 275, 118, 119, 120, 288, 59, 45; 365/120, 127; 346/76 L, 137, 135.1; 350/167, 130, 131

[56] References Cited

U.S. PATENT DOCUMENTS

| | | | |
|---|---|---|---|
| 1,956,626 | 5/1934 | Robbins | 369/112 |
| 2,077,518 | 4/1937 | Eggert et al. | 369/112 |
| 2,092,892 | 9/1937 | Runge | 369/112 |
| 2,923,781 | 2/1960 | Gordon, Jr. et al. | 369/112 |
| 3,357,770 | 12/1967 | Clay | 350/167 |
| 3,427,942 | 2/1969 | Browning | 354/150 |
| 3,712,727 | 1/1973 | Bonnet | 350/167 |
| 3,818,148 | 6/1974 | Dickopp | 369/112 |
| 3,944,727 | 3/1976 | Elliott | 369/111 |
| 3,959,581 | 5/1976 | Laub | 369/112 |
| 3,980,818 | 9/1976 | Browning | 369/32 |
| 3,999,008 | 12/1976 | Bouwhuis et al. | 369/111 |
| 4,020,278 | 4/1977 | Carre et al. | 369/275 |
| 4,101,947 | 7/1978 | Lambeth | 369/13 |
| 4,163,600 | 8/1979 | Russell | 369/59 |
| 4,272,574 | 6/1981 | Lippits | 369/275 |
| 4,399,529 | 8/1983 | Leterme | 369/112 |

FOREIGN PATENT DOCUMENTS

1235192  5/1968  United Kingdom ............... 369/112

Primary Examiner—Alan Faber
Attorney, Agent, or Firm—H. Michael Brucker

[57] ABSTRACT

An optical data storage system includes automatic compensation for shifting movements of the reading/writing beam and other imperfections which otherwise would affect the focusing or location of focus of a laser light beam onto a data storage record. Servo motors and associated apparatus common in the prior art are avoided. The recording or reading laser beam is directed as parallel light toward the data recording medium, but is first focused generally to a line by a first cylindrical lens supported by the laser source apparatus and transverse with respect to the orientation of data tracks of the data storage record. This produces a beam which is parallel in one direction as it approaches the data storage record. The beam is then focused substantially to a point by a second cylindrical lens perpendicular to the first lens and attached to and moveable with the data storage record as an integral part of a disk or card or other data storage structure. A series of such second cylindrical lenses are positioned side-by-side, with parallel longitudinal axes, on the data storage record. In this way, transverse relative movement of the laser beam with respect to the data tracks and the data record lenses and changes in the separation distance between the laser source and the data storage record, will not result in substantial defocusing or of a shift in the location of the beam focus point on the data record.

37 Claims, 14 Drawing Figures

OPTICAL DATA STORAGE AND RETRIEVAL APPARATUS

REFERENCE TO RELATED APPLICATION

This application is a continuation-in-part of copending application entitled OPTICAL DATA STORAGE AND READOUT APPARATUS, Ser. No. 575,457, filed Jan. 30, 1984, now abandoned.

BACKGROUND OF THE INVENTION

The invention relates to optical data storage, and particularly to high-density optical data storage involving the recording of data by burning or otherwise creating tiny pits into a data storage record medium using a relatively strong, pulsed focused laser beam, and reading of the data record using a relatively weaker continuous focused laser beam.

Optical devices have the potential for storage and retrieval of data at densities and rates far in excess of those possible using known magnetic techniques. In magnetic data storage, density is limited, inter alia, by the necessity of relatively large spacing between adjacent tracks of data in order to maintain the required magnetic separation. To the extent that a laser beam can be focused to a spot of serveral microns or less and accurately located on a data storage record and maintained in focus during operation, track-to-track separation is significantly less that that required for magnetic based systems.

Accordingly, high-density optical data storage requires extreme accuracy in the location of a focused laser beam, both in recording the data and in reading it. Slight variations in the distance between a data record and a laser source producing a converging beam can move the focal point of the beam off the data record resulting in an enlarged spot on the record which can lead to inaccurate results in both recording or reading data. Similarly, relative lateral shifting of the moving data record with respect to the laser beam during recording or reading can cause a beam to record or read at the wrong location. Vibrations or other eccentric movements from mechanical components or even dimensional changes in the data record medium due to temperature and humidity require that means be provided to maintain the laser beam in focus on the data record and at the proper location.

Present day devices using laser optics employ a rotating mechanism to carry data on a disk past a read/write laser beam. In order to maintain the necessary focus and position accuracies, the disks must be formed with precision and all moving parts must be carefully made to avoid, to the extent possible, extraneous motion. These systems are expensive to make and operate and pragmatic considerations require that system densities be compromised to some extent.

Since real systems are never perfect and some unwanted movements will always be experienced, some type of compensating mechanism must be deployed in optical systems if high density storage is to be realized.

Prior to the present invention, maintaining a laser beam in focus and on target has been accomplished by detection devices and servo motors to correct the relative positions of the laser and the data record in response to sensed inaccuracies in these positions. While this approach has worked well enough to permit commercialization of audio and video optical players, it has yet to produce an acceptable system for computer data storage.

The prior art does not contemplate, in the context of optical data storage, a recording and reading system which premits mechanical inaccuracy or other factors giving rise to transverse shifting and slight variations in separation between the laser source and the data record, while still providing the required accuracy for high density operation without the use of expensive, complex servo systems.

SUMMARY OF THE INVENTION

The present invention achieves a high degree of focus and location accuracies in a system that permits the use of less than high precision mechanical components and eliminates entirely the need for servo motors and the detection systems that drive them. In prior art systems, the optical components which form and direct a light spot onto a data record are fixed to the laser light source. Thus, the object lens (the lens that focuses the beam to a spot and locates it on the record) and the laser are fixed relative to one another and free floating relative to the data record. It is the maintenance of a fixed distance between the objective lens and the record for which the prior art uses servo motors. The present invention makes a bold and dramatic departure from the conventional by detaching the objective lens from the laser optical system and fixing it instead to the data record itself. By this arrangement the possibility of defocusing laterally to the data track due to changes in the distance between the objective lens and the object (data record) is completely eliminated.

Since the objective lens is no longer fixed to the laser, however, changes in the distance between those two components is now possible, with the attendent possibility of defocusing parallel light to the data track of the read/write beam if the distance between those components is not fixed. The potential problem is overcome by the use of a laser mounted cylindrical lens of large focal depth mounted in the laser optical system between the laser and the record mounted lenses so that for the most part the light in question remains focused.

By forming cylindrical lenses (the objective lens) on the record and positioning a laser mounted cylindrical lens to always be at right angles to the record (object) lenses, the focus and location of the laser beam on the data record will be substantially uneffected by those movements resulting from mechanical imperfections or record distortion for which the prior art attempts to compensate by using servo motors.

More specifically, the optical data storage system of the present invention accommodates for mechanical inaccuracies and relative record shifting by directing toward the data storage device (record) a laser beam which comprises parallel light in one direction, converging only toward line focus perpendicular to the data track being recorded or read. Relative lateral shifting of the beam of parallel light relative to the data record is therefore not consequential.

As the light approaches the data storage medium it is focused to a point on the data record by the cylindrical lens affixed to the data record itself. The data storage device may comprise a circular disk or a linear array having a series of side-by-side similar cylindrical lenses mounted on the data record surface in a generally coplanar arrangement. In the case of a circular disk, the series of cylindrical lenses may describe concentric circles or spiral patterns.

In one embodiment of the invention, an optical data storage device for reading and/or recording digital data information on a data record and using a beam having parallel light includes a first lens means disposed in the path of the light beam and operative to focus the beam to a line, and a second lens means affixed to and a part of the data record. The second lens means is disposed in the optical path of the light beam from the first lens means, and is operative together with the first lens means to focus the beam to a point on the data record.

For varying the location of the focused point of light under a lens on the data record, the optical data storage system preferably includes means operable to vary the angle at which the light beam is directed to the second lens means. This may be a tilting mechanism on the light source, or more preferably a moving mirror in the optical path of the system.

The invention also encompasses the optical data storage record or medium itself, including the series of cylindrical lenses fixed in position on the data record. The series of lenses on the data record are generally cylindrical convex lenses of a focal length which focuses parallel light onto the data record surface. A particular data track running parallel to and under a given lens is selected by varying the angle of approach of the parallel light relative to the lens surface.

It is therefore among the various objects of the invention to eliminate any need for servo motors for dynamic correction of relative shifts of position and inaccuracies of position in a laser recording or reading system, by achieving the final focus of the beam onto the data record using a cylindrical lens which is mounted on and fixed in position with respect to the optical data record itself. A related object is to provide an optical data storage medium adapted to receive recording or reading light which is parallel with respect to one direction of view, and to focus that light to a point on the data record using one or a plurality of convex cylindrical lenses mounted directly on and forming a part of the medium. These and other objects, advantages, features and characteristics will be apparent from the following description of a preferred embodiment considered along with the accompanying drawings.

DESCRIPTION OF A PREFERRED EMBODIMENT

Figure 1:
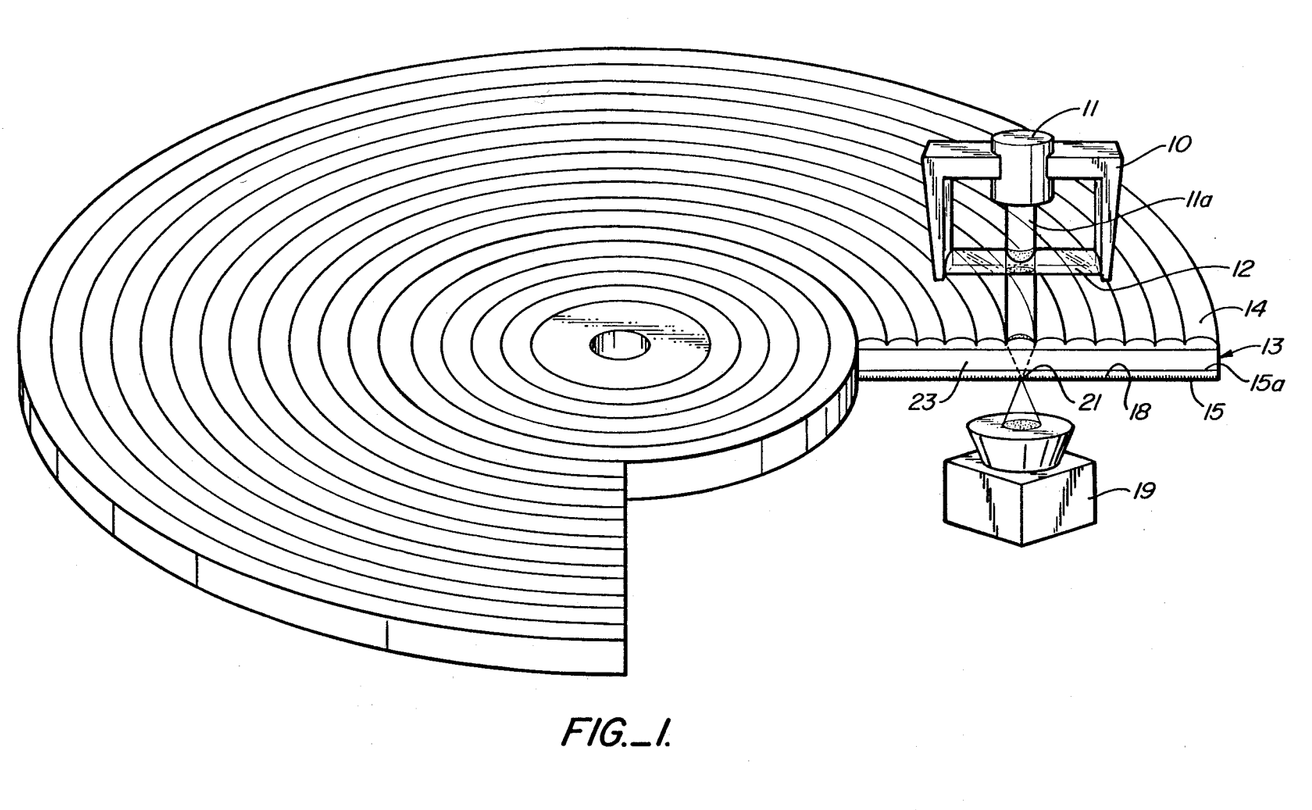
FIG. 1 is a perspective view showing schematically an optical data storage system of the invention and particularly illustrating a data storage disk which is partially cut away to show a series of cylindrical lenses forming a part of the disk.

In FIG. 1 and in other drawing figures the components of the system are not to scale, with certain features shown greatly out of proportion to better illustrate the operation and structure of the invention.

Figure 2:
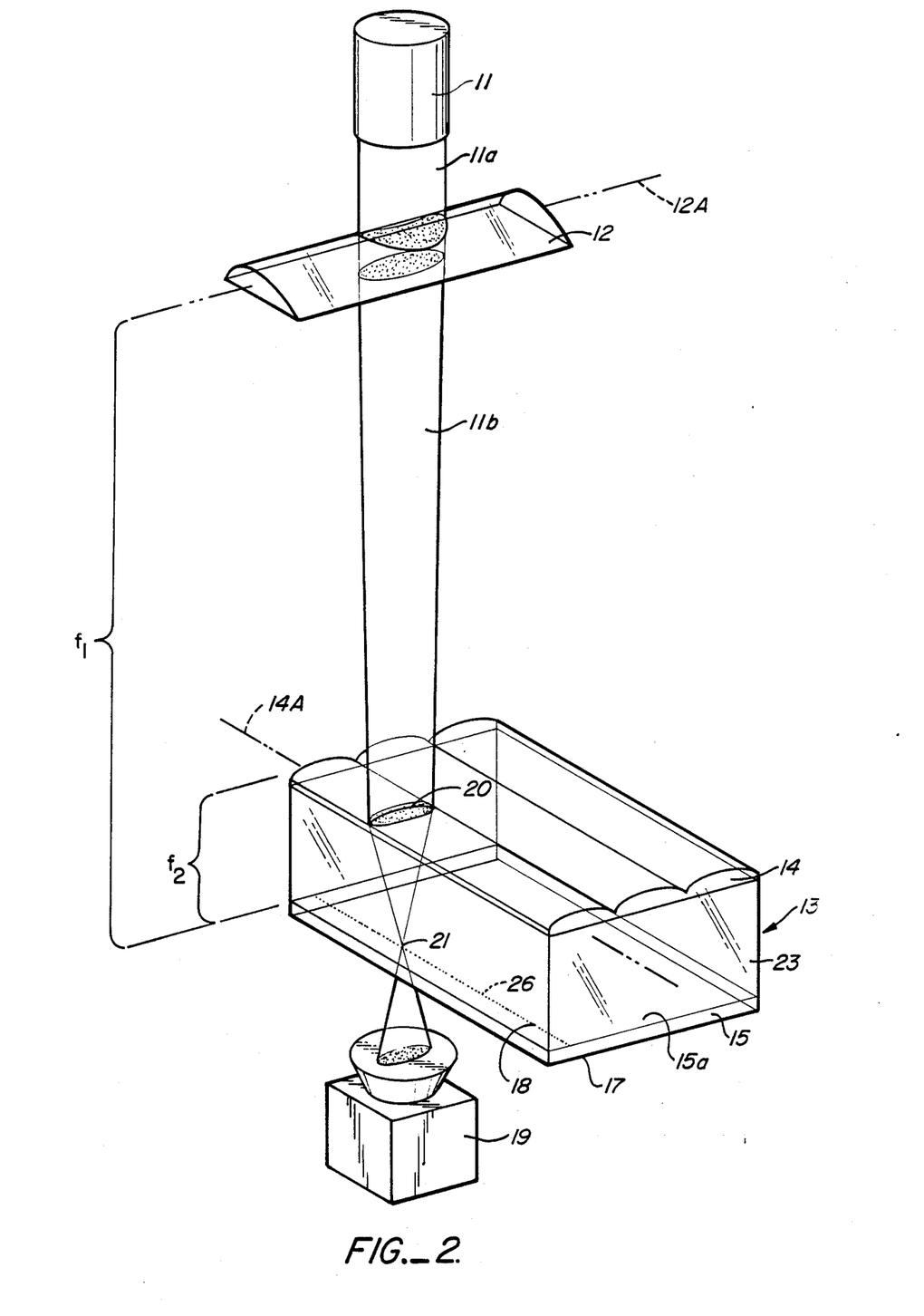
FIG. 2 is a schematic perspective view indicating the manner in which a reading light beam is focused to a point on a data track of a data record forming part of either the disk of FIG. 1 or of a structure with linear data tracks.

Referring to FIGS. 1 and 2, the invention includes a source 11 of parallel light 11a, preferably a laser such as a laser diode, and a cylindrical light source lens 12 fixed to the light source 11 as by an optical housing 10 (FIG. 1). The lens 12 is selected to have a relatively long focal length $f_1$ and as is characteristic of cylindrical lenses converges light in a plane perpendicular to the lens axis 12a, while leaving uneffected light in a plane parallel to axis 12a. Thus the beam 11a from laser 11 will become beam 11b after passing through lens 12 and converge in one direction of view and remain parallel in a direction of view 90° therefrom, giving rise ultimately to line focus.

The invention also includes an optical data storage device 13 (in one form a disk) having a series of cylindrical lenses 14 as its upper surface for focusing light. Once again the cylindrical lenses 14 converge light perpendicular to their axes 14a and leave uneffected light parallel to that axes. Affixed at or near the bottom of storage device 13 is a data record medium data sheet 15 having a surface 15a. The light from lens 12 is focused to a spot by lens 14 by maintaining the two lenses perpendicular to each other and the spot is located at surface 15a by selectiing lens 14 to have a focal length $f_2$ which is equal to the distance between the lens and the record surface 15a.

For purposes of clarity it is only possible to illustrate a small number of data lenses 14 in the drawing. In practice lens widths of the magnitude of 0.04 inches (approximately one millimeter) are contemplated whereby a cross-section such as that shown in FIG. 1, for a disk 5 inches in diameter would include more than 50 lenses from center to circumference.

The light source 11 provides a beam 11a which can be either a relatively strong beam for recording data on a data record surface 15a, as by burning a small hole or pit (10 microns or less)in the recording surface, or otherwise changing the light transmitting or reflecting characteristics of the record, or it may be a relatively weaker beam in the mode where data is being read, all as in well known in the art.

As will be more fully described below, each lens has a multiplicity of data track locations 18 (data lines defined by data pits) beneath it which may number as high as 1000 for a lens width of 0.04 inches. The data tracks define straight lines, arcs, concentric circles or spirals or any other geometry that is determined by the geometry of lenses 14. The lenses 14 and data tracks 18 and the storage device 13 need not be circular, but may alternatively be linear, positioned on data storage cards (credit card size) as will be described in greater detail below.

The light source 11 and lens 12 are oriented so that axis 12a of lens 12 is always perpendicular to the axis 14a of lens 14. In this way, lens 12 converges the parallel beam from source 11 to a line at the record surface 15a and a lens 14 converges the line to a point at record surface 15a to form or read a pit along a track 18.

As is generally known in the art, a photodetector 19 positioned below device 13 can be used to receive light from each light-transmissive data pit and generate an electrical signal in response thereto. The present invention is useful with known systems where the stored information is contained in the distance between bits of recorded data. For example, there may be ten different possible spacings between consecutive pits on the data sheet 15 in a track 18, each representing different information, such as a different digit form 0–9. The spaces can also represent other data or be used in combinations to indicate yet other data. By use of the improvements of the present invention, the maximum spacing between pits for a given spacing set may be as small as one pit diameter which may be as small as one micron or less.

The source lens 12 is preferably a cylindrical lens, but it could be a cylindrical mirror reflecting the beam 17 as a beam converging toward line focus, toward a data lens 14 on the disk 13. In any event, the source 11 and source lens 12 are fixed to each other and not fixed to the object lenses 14 which are instead fixed to the data storage record 15.

Referring to FIG. 2, the data storage device 13 (a portion of which is shown cut away from the remainder) comprises a data sheet 15 substantially at the bottom of the device 13 and having a data record surface 15a, a transparent or translucent spacer layer 23 above the data sheet, and a lens sheet 24 on the spacer layer. There may be an air space (not shown) between the data sheet record surface 15 and the spacer 23, (appropriately supported) to permit pits to be burned into the data record during the write mode without interference from the spacer. A reflective coating can be applied as the bottom layer 17 of the record to permit movements of the record to be optically detected by reflecting light off of the bottom surface and projecting that reflected light through an optical system that compensates for such detected movements. A description of such a system can be found in the patent of Leonard J. Laub, U.S. Pat. No. 3,959,581, issued May 25, 1976 for "Self-Compensating Focus System for Optical Video Playbreak Device".

A data track 18 is defined by data bits (pits) 26, the size and spacing of which are exaggerated to permit illustration. The unique optical arrangement of the present invention enables the data bits to be very densely arranged on the data record and still be read with a high degree of accuracy. For example, densities of 1 gigabyte on a twelve inch disk or 80K on a standard credit card are realistic expectations. As mentioned above, there may be ten different spacings between pits 26, with the maximum space between pit edges in a given track being about one pit diameter. The pits themselves can be on the order of a single micron in diameter, since the system of the invention enables such precision in focusing and locating the read/write beam.

To give an idea of the actual dimensions of a data storage device according to the present invention, each data lens 14 may be approximately one millimeter in width, for example, 200 separate data tracks 18 located under each data lens. The ability to locate so many tracks under a single lens flows from the fact that unlike magnetic recording, large track-to-track spacing is not required. For a beam focused on the record to a one micron spot, for example, a one and one-half micron space between tracks will provide adequate separation of data. But even track-to-track spacings of 10 microns produces data densities far greater than those possible magnetically.

As the light beam 11a approaches the lens sheet 14 directed at a particular data lens 14, as shown in FIG. 2, it converges toward line focus—not point focus. The theoretical line of covergence toward which the beam 11b tends to focus is substantially perpendicular to the length of the data lens 14 and the data tracks 18 and located on surface 15a. At any given point the beam "line" 20 can be said to be substantially perpendicular to the "longitudinal axis" 14a of the data lens, although data lenses can be either linear or curving. Thus, the term longitudinal axis as used herein and in the claims is intended to apply to either linear or curving lenses.

The data lens 14 on the lens sheet 24 receives from the source lens 12 light which is parallel in the direction looking longitudinally down the data lens, and focuses this light beam to a point 21 substantially at the data sheet surface 15a, forming or reading one of the individual data bits 26.

The focal length $f_1$ of the source cylindrical lens (or mirror) is necessarily longer than the focal length $f_2$ of the data lens 14. Accordingly, the angle of convergence of the beam from the source lens 12 is smaller than the angle of convergence from lens 14. Therefore, variations in the separation distance between the light source means 11 (and therefore the cylindrical lens 12) and the data sheet 15 will produce only slight defocusing at the data sheet. When such a compensating system is added to this invention, $f_1$ should be as short as practical (light source as close to disk as possible). Where variation in light to disk distance is uncompensated for, however, slight defocusing caused thereby will have no effect on the location of the beam on a data track 18, but will only increase the spot size. This effect can be minimized by increasing $f_1$ to decrease the angle of convergence and divergence of the beam. If this defocusing is uncompensated for the density of data bits 26 would have to be slightly reduced. For many applications this is quite acceptable (e.g., audio, video, etc.). For other applications requiring higher densities, the compensating optics of my referred to copending application could advantageously be employed as could servo systems where extreme accuracy is demanded.

The most critical focusing of the light source beam is performed by lens 14 which being fixed to data sheet 15 is not subject to changes in distance between lens and target. By selecting the lens 14 to have a focal length equal to the distance to the data sheet surface 15a, parallel light received by lens 14 will be focused on surface 15a. The combination of a lens integrated on the data storage device and a column of parallel light as a read or write source produce startling results in terms of data track location and focus stability.

Figure 3:
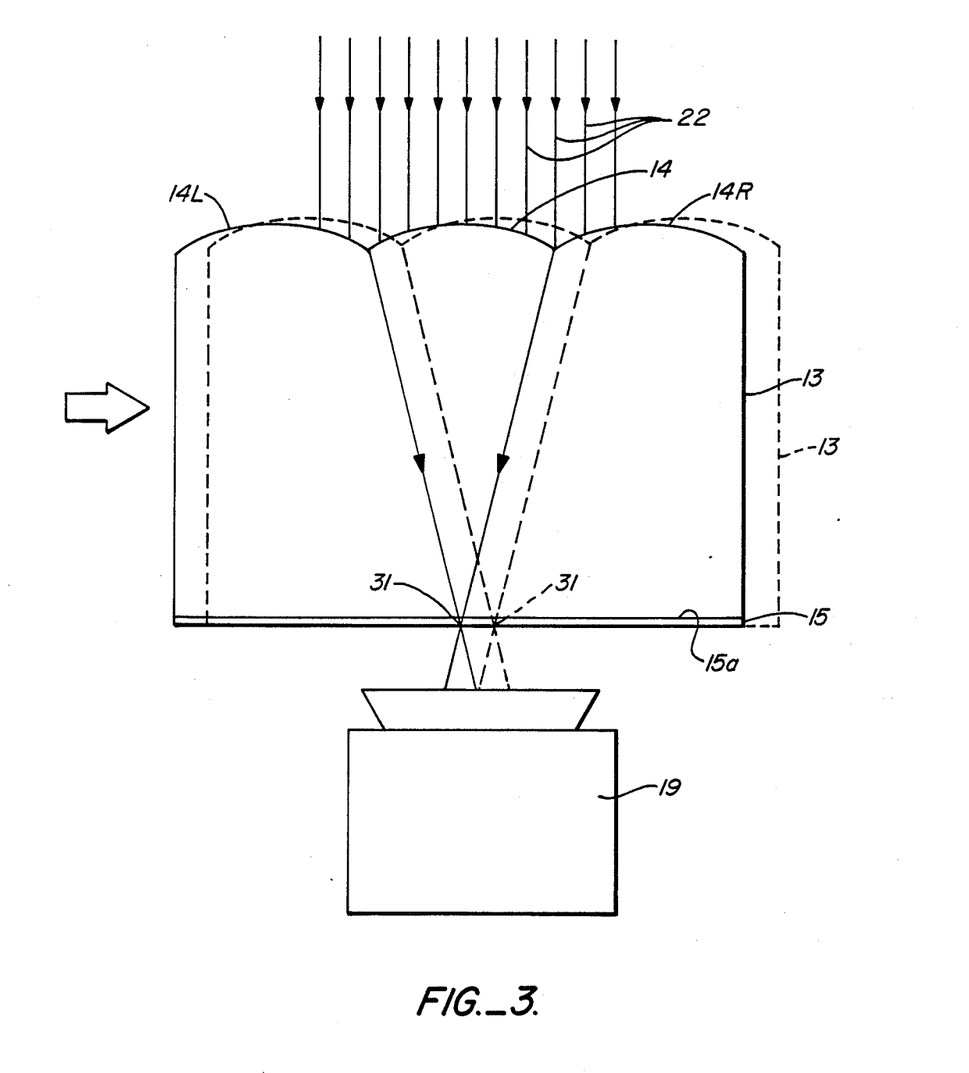
FIGS. 3 is a related view to FIG. 2 which may be considered in elevation showing the effect of relative shift of the data storage device of the invention with respect to the recording or reading light beam, which comprises parallel light in the direction of view of FIG. 3.

To illustrate this phenomenon, reference is made to FIG. 3 where a beam of parallel light 22 is directed onto the lens 14 which focuses the beam at a point 31 on data record surface 15a. The beam 22 may be somewhat wider or narrower than the width of data lens 14. If wider, the peripheral portions of the beam striking adjacent data lenses 14l or 14r will simply be harmlessly refracted away toward another area of the data sheet at which there is no detector 19 to perform any reading function. If the beam is recording data, a small portion of the light beam falling on adjacent lenses 14l and 14r will not contain sufficient energy to create a data bit at those locations. Where sufficient energy is available it is preferable to have the beam 22 somewhat narrower than the data lens 14, so that adjacent lenses will not be illuminated at all except for the most extreme excursions of the beam.

The solid lines of FIG. 3 represent a centered location of the data storage device relative to the read/write beam 22. If the data storage device should be shifted to the position indicated by the dashed lines due to effects of thermal expansion, vibration, slight eccentricity in a circular data storage record, imperfection in the locating of the light source 11 and the detector 19 with respect to a specific lens 14 or for any other reason, the location of the focused spot 31 on surface 15a will be uneffected. Similarly, a change in the distance between the data storage device 13 and the light source (FIG. 2) will not effect the location or focus of spot 31 through the lens 14.

These results can be understood by observing the events at the surface of lens 14. If there is no change in what is "seen" by lens 14, there will be no change in the effect of the light passing through the lens. Since light beam 17 is comprised of parallel light (in the plane of the paper), a lateral shift or a vertical move will not be detectable by the surface of lens 14. It will continue to "see" parallel light which it will focus to spot 31 below. If the record 13 should move up or down or side-to-side, the spot 31 stays firmly put at the same location on surface 15a so long as the angle of beam 22 does not change. To lens 14 all parallel light at a given angel is the same. Thus, it will focus that light at the same location. Accordingly, without the use of detectors and servo motors, data track location and focus is securely maintained.

Referring to FIG. 2, located below record 13 is photosensor 19, having an aperture slightly larger than rquired to intercept all of the light beam 11b diverging from image 21 It is readily seen that such aperture must be greater than $(DW/f_2)$, where D is the distance from data surface 15a to photosensor 19, W is the maximum width of beam 11b at the point of incidence of beam 11b with record 13, and $f_2$ is the focal length of cylindrical lens surfaces 14. Photosensor 19 may be any type of device which produces an electrical output dependent only upon the total intensity of light striking its surface, such as, for example, a photocell having uniform light measuring sensitivity across its light sensitive surface. Photosensor 19 is equipped with a shutter which may be used to block the light of beam 11b from reaching the light sensitive surface of photocell 19 during the write operation.

The illustrated arrangement with the photodetector 19 below the data storage device 13 (or on the opposite side of the device 13 from the source 11, for non-horizontal orientation of the device 13), is only one arrangement in which the data can be read. An alternative embodiment is for each data bit 26 defining data tracks 18 to be either reflective or non-reflective, preferably a non-reflective pit on an otherwise reflective surface. In such a system a photodetector is positioned somewhere above the lens sheet 24 for reading of reflected light, usually through a beam splitter mirror. Such reflected-light detection systems are generally well known, and thus need not be described or illustrated in the drawing.

Figure 4:
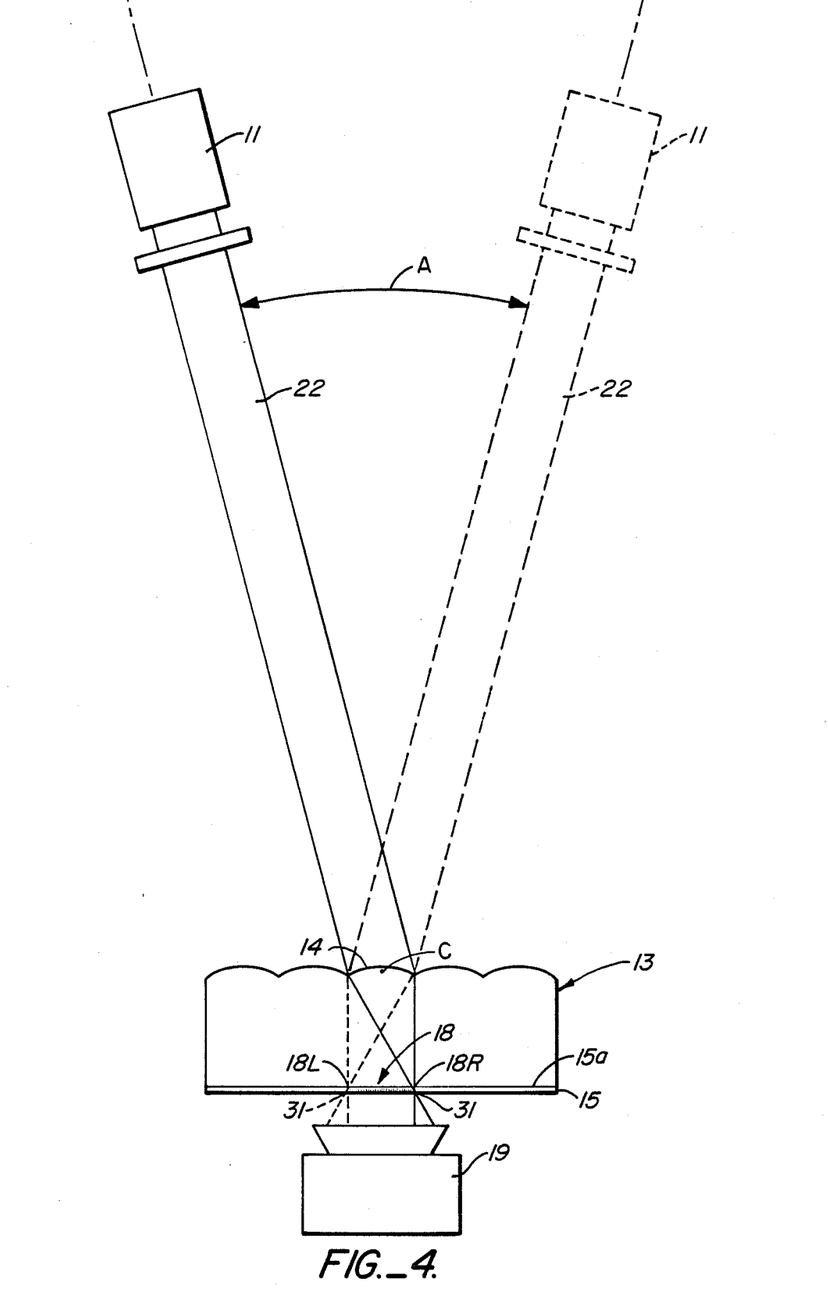
FIG. 4 is another schematic view which may be considered an elevational view, showing the tilting of the light source and beam while directed at a cylindrical lens on the data recording medium, for shifting the position of the resulting focused point of light laterally on the data record to read or record on different selected data tracks.

Referring to FIG. 4, moving the beam spot from track-to-track under a specific data lens 14, in reading or recording of data on the data sheet 15, is accomplished by changing the angular orientation of the light beam 22 relative to the surface of lense 14. This can be accomplished by moving the light source itself or by rotating a mirror (not shown) in the optical path. The light beam 22 is parallel in the direction of view of FIG. 4 as it approaches the subject data lens 14, and it will be refracted to a point of focus substantially at the data sheet surface 15a regardless of its angular orientation or angle of approach, within limits. If the position of the light source means 11 is tilted substantially about an optical center c of the the subject data lens 14 within a plane perpendicular to the data sheet and to the longitudinal axis of the lens 14, the effect will be to move the beam focus point 31 laterally. In this way a data track 18 can be selected between the extreme data tracks 18L and 18R.

In the case of reading data, the photodetector 19 preferably is of such a size that the movement of the beam from one track to another under the same lens will not project light through a pit outside of the detector's "visibility". The photodetector can be moved to follow the beam, but in the track density contemplated by the invention it is adequate and preferred to have the photodetector 19 remain in a single location for reading all data under a single lens 14.

Since high density data storage is the desiderata of the invention, the effects of optical aberration which occur in movement from one data track 18 to another cannot be ignored. With a truly cylindrical lens 14, i.e. a lens of uniform curvature (called "spherical" in optical terms, meaning a true circular arc even in a cylindrical lens), the field of focus of the focal point 31 as it is scanned will not be flat but, in fact, will be a curved field. Thus, although the focal point 31 can be in precise focus at the center (axial focal point) of the plurality of data tracks 18 under the lens, or can be precisely in focus at the extreme left and right data tracks 18 as viewed in FIG. 4, it will not be in sharp focus at all data track locations on the flat field 15a.

Figure 5A:
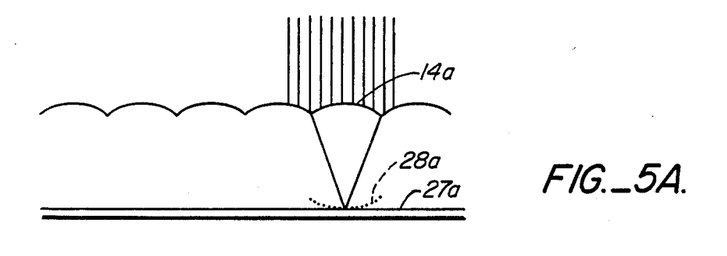
FIGS. 5A through 5D are a series of schematic views which may be considered elevational views, showing effects of and geometric arrangements for correcting optical aberration in the focusing of a reading or recording light beam selectively over a field of lateral positions representing different data tracks under a particular lens on the data record.
Figure 5B:
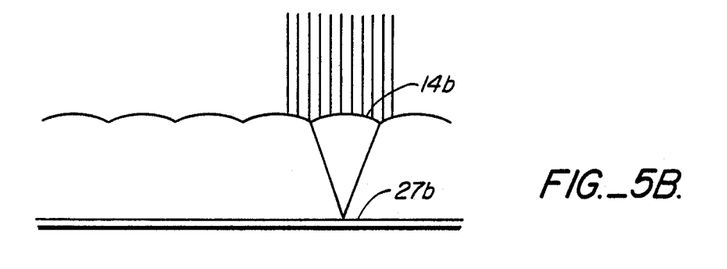
Figure 5C:
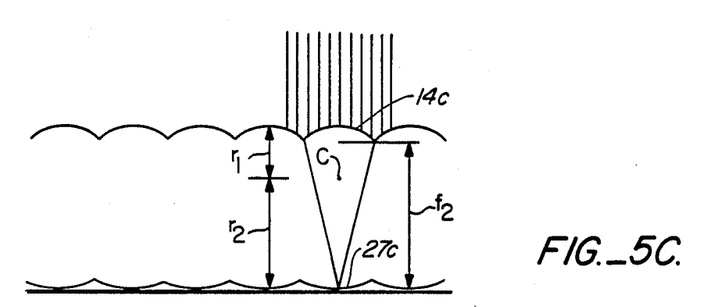
Figure 5D:
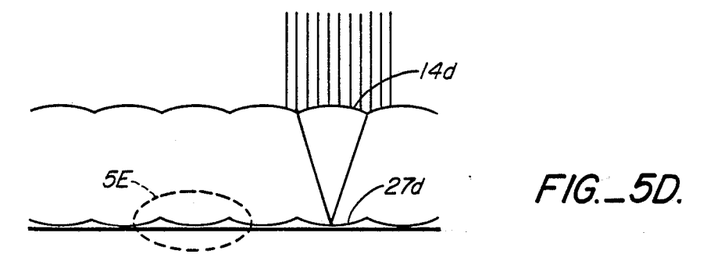

FIGS. 5b, 5c and 5d illustrate alternative approaches for correcting for this aberration. Referring first, however, to FIG. 5a, data lenses 14a of uniform curvature (truly spherical lenses), over a flat field data record 27a, result in a curving locus of focal points 28a (exaggerated) which intersect the data record 27a at the axial focal point only. In the context of the present invention, the contemplatd data densities cannot tolerate the error that would be introduced by a cylindrical lens having uniform curvature, over a flat data record surface. Correction for this aberration is therefore required.

Referring to FIG. 5c, the lens 14c is truly spherical, and the data sheet surface 27c on which the data bits are imprinted and read is also spherical, making it possible to achieve identical focus at all track locations under the lens.

Referring to FIG. 5b, the data sheet surface 27b is again flat, but the data lens 14b is aspherical, i.e., not of uniform curvature. With such an arrangement a close approximation can be made to true focus throughout the flat field of the data tracks beneath the aspherical lens 14b although at no point will all of the entering parallel light in the beam be gathered to the sharpest possible focus. The beam can, however, be adequately focused for reading and recording of densely stored data within the purposes of the invention, except in those cases where extreme density is required.

Referring to FIG. 5d, another alternative for correcting for spherical aberration utilizes lens 14d which is aspherical, and a data sheet having a surface 27d which is also aspherical. Thus, an aspherical curving field is matched to an aspherical lens. By this arrangement, a close approximation of precise focus can be attained through the field of data tracks under the lens 14d.

For a spherical lens 14c (FIG. 5c) having a radius $r_1$, centered at c, the radius $r_2$ of the curved field of focus below will be equal to $f_2 - r_1$ and will also be centered at c.

Figure 5E:
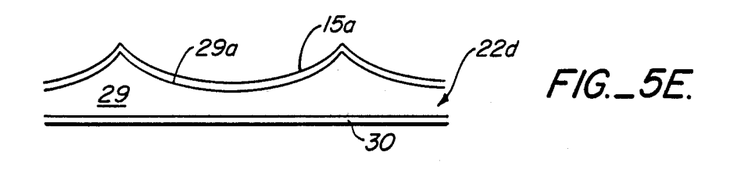
FIG. 5E is an enlargement of a portion of either FIG. 5C or 5D showing a recording surface and base in greater detail.

Referring to FIG. 5E, an enlargement of a portion of the data sheet 27d (or 27c for that matter) illustrates that the recording surface 15a is very thin, for example, on the order of only a few microns. This thin layer is supported on a sutiable base 29 which may be coated on its planar bottom surface 30 with a reflective and/or protective material. The upper surface 29a of base 29 is formed to be spherical (27c) or aspherical (27d) as required and registers with a lens (see FIGS. 5c and 5d) which has a locus of focal points which fall on the surface 15. The data sheet 15a may be tellurium, deposited in a coating of about 5 micron thickness. Tellurium and other materials suitable for writing and reading pits with a laser beam are well known in the art, and thus a detailed discussion of that aspect of the invention is unnecessary.

Before describing the system illustrated in FIG. 6, it should be emphasized that the particular apparatus described immediately below represents only one means for effecting the movements of the light beam according to the invention, and that other systems may be used without departing from the invention. For example, tilting of the light beam 17 may be accomplished using a moveable mirror as more fully set forth in my copending application referred to above rather than by tilting the light source as described herein.

Figure 6:
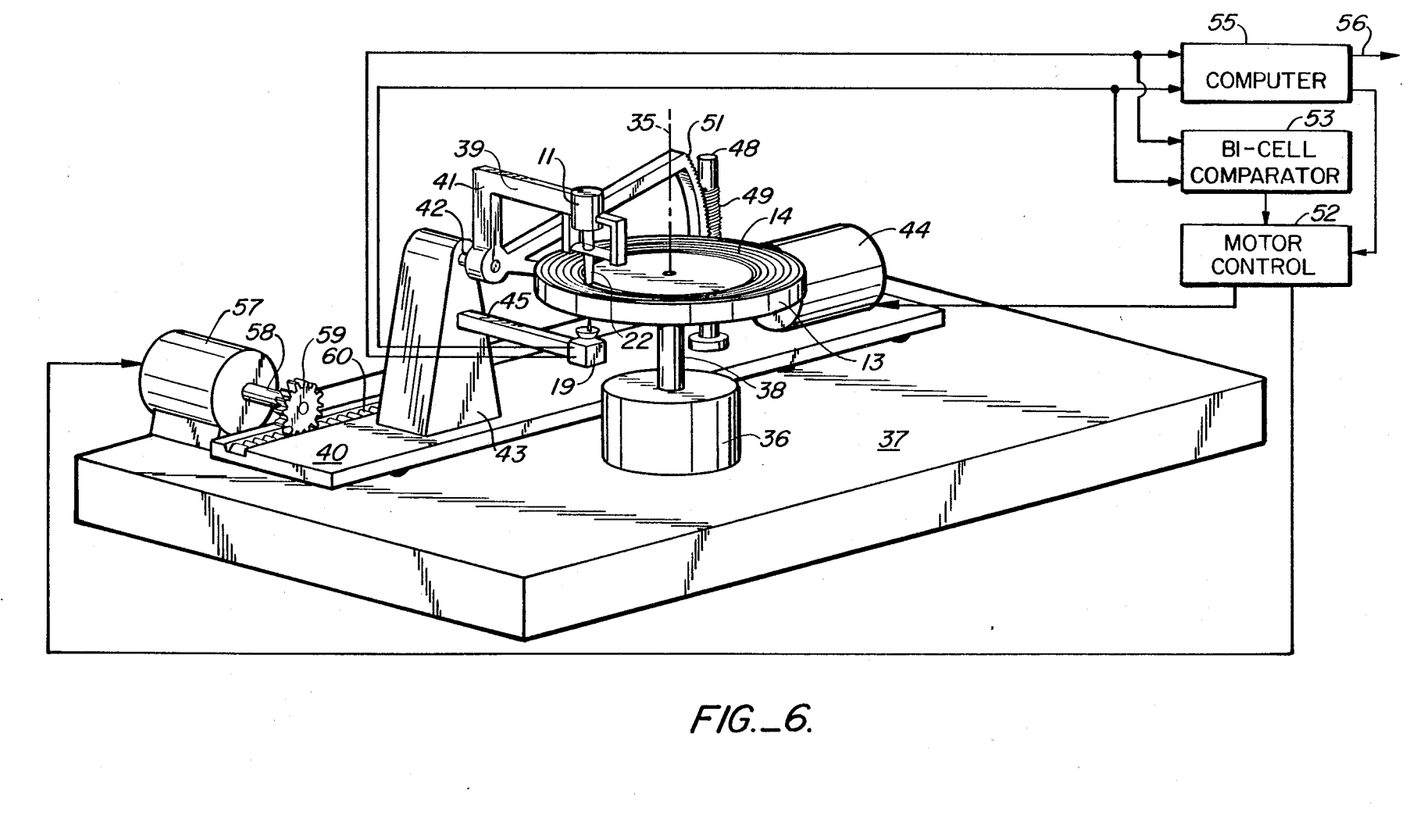
FIG. 6 is a somewhat schematic perspective view showing a form that major components of the system of the invention may take.

Referring now to FIG. 6, in this embodiment of the invention, the optical data storage device 13 is in the form of a rotatable disk having a series of concentric circular data lenses 14 formed in its upper surface (see FIG. 1). The lenses 14 can alternatively be in the form of concentric circles, a continuous spiral pattern, or in a series of concentric spiral sections which are not continuous with each other; the basic operation of the system is not materially altered by the lens geometry. Similarly, the data tracks 18 under the lenses (as seen in FIGS. 1, 2 and 4) may be in a pattern of concentric circles, in a continuous spiral from outside to inside, or in a series of discontinous spiral segments, e.g., one spiral segment under each data lens 14, the data lenses 14 being circular in the latter case. In any event, the data tracks will have a geometry dictated by the geometry of the lenses 14.

The optical data storage disk 13 is driven about a vertical axis 35 (or other desirable non-vertical orientations depending upon the orientation of the entire system) by a disk drive motor 36 mounted on a base 37. The disk 13 is driven in the manner of a conventional turntable; a shaft 38 driven by motor 36 rotates the disk 13. The principal feature of the invention—the optical data storage device 13 which includes the data lenses 14 fixed to the disk or other data sheet configuration—enables precision in reading and recording beyond obtainable by precision of mechanical parts alone. Accordingly, the present invention permits the use of less precise mechanical parts to achieve a given degree of accuracy attained by the prior art by extremely precise parts and servo motors.

The light source 11, preferably a laser light source, is mounted on an extension arm 39 of a frame 41 which is pivotally supported about a horizontal shaft or axis 42. The shaft 42 is rotatably mounted in a pivot support stand 43 which is supported on a moveable base 40. The light source 11 is positioned to direct a beam of light 22 through one of the cylindrical data lenses 14, and through the data record surface near the bottom of the disk 13, to the photosensor 19 which is mounted on support arm 45 and positioned below the disk 13 directly below the light beam 22. Support arm 45 is attached to support stand 43 and of a length and orientation such that when base 40 is moved, detector 19 moves along a line parallel to a diameter of disk 13. The photodetector 19 preferably is large enough to receive light from any track under a single lens 14. An alternative embodiment would mount detector 19 to frame 41 for rotation therewith whereby when the support frame 41 is rotated about the horizontal axis 42, the photodetector 19 is tiltable along with the frame and the light source 11.

The tilting movement of the light source 11 has the effect of moving the focused beam from one data track to another as explained earlier with reference to FIG. 4.

Adjustment of the angular orientation of the beam (and in the alternative embodiment, the photodetector) to effect movement of the focused beam from track to track under a give lens, is controlled by a step motor 44 and associated gearing, (partially hidden from view). For example, the step motor 44, through intermediate reduction gearing, drives a shaft 48 bearing a worm gear 49 which in turn drives a sector gear or rack 51 on an arcuate edge of the pivoted frame 41.

The step motor 44 is controlled by a motor control unit 52 which receives input from a bi-cell comparator 53. The comparator 53 receives electrical signals from the photodetector 19.

Initial alignment of a newly inserted record disk 13 may be achieved according to the embodiment of the invention where the detector tilts with the light source by means of a photodetector 19 which is split into two closely spaced sections (commonly known and referred to as a "bi-cell"). When the system is aligned so that a given data track 18 is perceived by both halves of the bi-cell equally, then the optical system is centered on that data line. Small misalignments of 5% or more of the track spacing will cause a correction pulse to be sent to the stepping motor 44, by means of the bi-cell comparator 53, which instructs the stepping motor control unit 52 to send a pulse to the stepping motor 44. The single pulse process may be repeated until the optical system is alinged to the center of one of the data tracks 18. Once centered on any data track, the system can access adjacent data tracks by sending the proper number of pulses to the stepping motor 44.

The bi-cell comparator 53 is a two input amplifier having high output when the first input is higher than the second; the output is low if the reverse is true. The stepping motor control 52 is a microprocessor and pulse generator which sends phased pulses to the stepping motor 44, with such phase as to rotate the stepping motor in one direction if the input to the stepping motor control unit is high, and in the other direction if the input is low.

It should be understood that other means and methods can be used to center the source on a data track. For example, if the photodetector 19 is fixed as in the embodiment of FIG. 6, the stepping motor 44 is directed to scan back and forth on a track until maximum light is detected from the pits on that track, indicating the beam is centered on the track.

Track-to-track selection is made by a computer logic unit 55 which sends a predetermined number of pulses to the stepping motor to move the beam exactly on a data track or a multiple thereof. The signal from both halves of the bi-cell is summed and sent to the computer as the data signal from the recording disk 13, and in this way the recorded data is read.

When a data track has been completely read, the computer logic unit 55 determines this and sends a signal to the motor control unit 52, which signals the step motor 44 to advance the reading system to tilt the orientation of the light beam 17 and the photocell 19 to move to another data track.

The data emanating from the photodetector 19, through the computer logic unit 55, is sent to a terminal (via an output line 56) to be presented in readable form for an operator or for automatic operations to be controlled by the encoded optical data.

When data located under a different data lens 14 is to be read (or recorded), the optical data storage disk 13 and the read/write apparatus must be moved laterally relative to each other along a radius of the disk. This may be accomplished by translating the position of the disk drive motor 36 so as to move the disk 13 accordingly, or by moving the base 40 on which both the pivot support stand 43 and the step motor and gearing are mounted, while leaving the disk drive motor 36 and disk fixed, on the main base 37 (the embodiment illustrated). Another stepping motor 57 with internal reduction geaing and an output shaft 58 carrying a gear 59 engaged in a gear rack 60 on the moveable base 40, operates the lens to lens movement.

The operation of the motors 44 and 57 is different if the data lenses 14 and/or the data tracks 18 are arranged spirally rather than in concentric circles. If both are continuous spirals, for example, the motors 44 and 57 will operate simultaneously and continuously as the disk 13 is rotated and read, instead of stepping.

The angular accuracy required to scan among the data tracks 18 under a particular lens 14 is best illustrated with reference to FIG. 4. The total angle scanned to cover, for example, 200 lines recorded between extreme left and right data tracks 18*l* and 18*r*, respectively is determined generally by the distance from the center of rotation c to the data surface 15*a*. This total angle is indicated by the angle A in the figure.

The value of the angle A is dependent on the value of a number of design parameters. In a preferred embodiment the width of the cylindrical lens surface 14 is about 0.04 inch. The thickness of the recording disk 13 may be about 0.125 inch. A preferred material for the disk is methyl methacrylate. These choices result in the angle A being about 27 degrees. If the total number of tracks 18 is 200, the angle between data tracks 18L and 18*r* is then about 27/200 degrees or about 0.135 degrees. This is a very reasonable angle that can be accurately set by mechanical means well known in the art.

In the apparatus of FIG. 6, the stepping motor 44 may be set to rotate through a preset number of revolutions or portion of one revolution for each pulse received from the stepping motor control unit 52. The associated reduction gearing is such that each step is a known portion of a data track separation, so that adjustment can be made to initially center on a data track, and therefore a preset number of pulses (steps) will move the beam to an adjacent or other selected track.

Figure 7A:
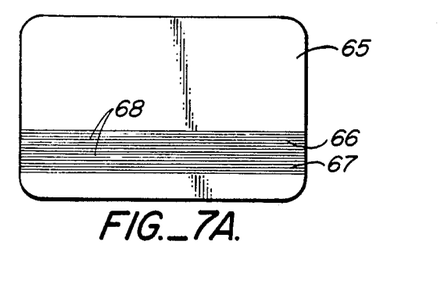
FIG. 7a is a plan view of an optical data storage card having a series of side-by-side linear lens surfaces mounted over a data storage record, all integral with the card.

Referring to FIG. 7a, an optical data card 65 preferably the size and shape of s standard credit card, has a linear strip 66 which includes a lens sheet 67 having a series of data lenses 68 arranged in parallel, linear relationship similar to those shown in FIGS. 3 or 5*b* through 5*d*, and discussed above. Data is recorded on and read from card 65 using a beam of light and a photodetector as discussed above, with the card moving longitudinally in the direction of the data lenses 68 relative to the light beam and the photodetector.

Figure 7B:
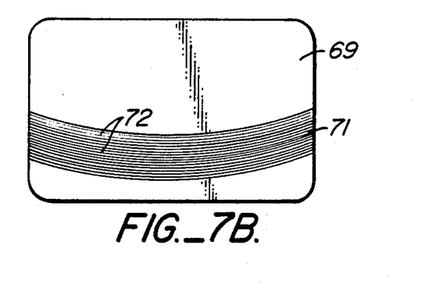
FIG. 7b is a plan view of a card similar to that of FIG. 7a but illustrating an optical data storage card having a series of arcuately configured lens surfaces over the data record.

FIG. 7*b* illustrates a data card 69 similar to the card 65 of FIG. 7*a*, except that the lens sheet 71 and individual lenses 72 on the card are arranged arcuately as a series of concentric arcs of circles.

Figure 8:
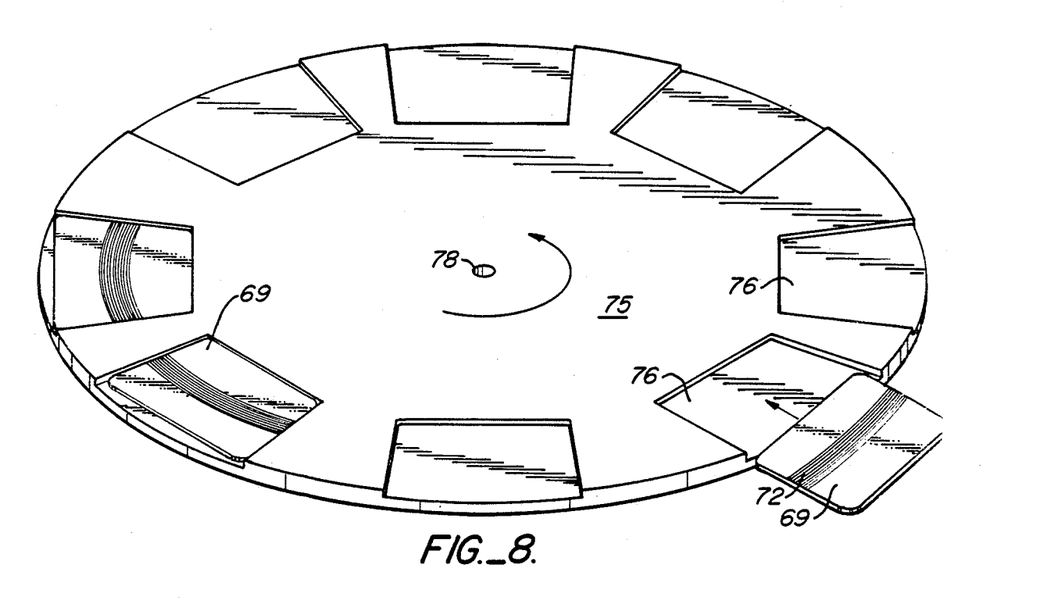
FIGS. 8 and 9 are views showing a rotatable disk having slots for receiving data storage cards of the general type shown in FIG. 7b, whereby the arcuate lenses and optical data storage tracks below them can be read or recorded by a light beam when the disk is rotated.
Figure 9:
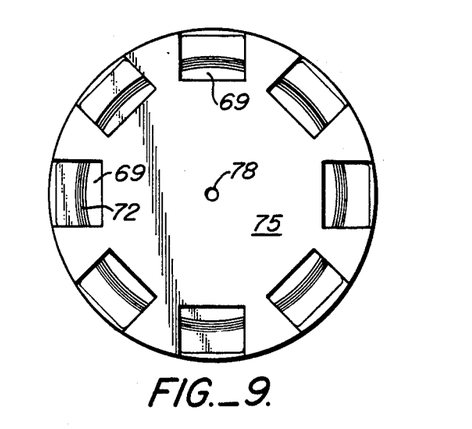

FIGS. 8 and 9 illustrate a turntable 75 having slots 76 sized to receive data cards 69 of the type shown in FIG. 7*b*, with arcuate optical data patterns 77. The arcuate lenses 72 are segments of a circle having a center coincident with the center of rotation 78 of the turntable when place in a slot 76. This enables the optically stored data to be read in the manner described above with reference to FIG. 6 while the turntable 75 is rotated. A plurality of individual data cards 69 may be read or recorded at one time permitting various data sources to be combined thereby opening up a myriad of interesting possibilities.

The embodiments shown and described herein are for illustrating the principles of the invention but are not intended to be limiting of the scope of the invention. Other embodiments will be apparent to those skilled in the art and may be made without departing from the invention, as defined in the following claims.

What is claimed is:

1. Optical data storage apparatus for high density storage and high rate retrieval of digital information comprising in combination:
   a data sheet for high density storage of optically readable digital information;
   a light transmitting lens sheet overlying said data sheet and affixed thereto;
   a plurality of aligned and closely spaced cylindrical data lenses formed in the surface of said lens sheet whereby parallel light passing through said lens sheet is focused onto said data sheet;
   wherein the curvature of said lenses and the geometric shape of said data sheet provide a correction for optical aberration.

2. The invention of claim 1 further comprising a plurality of data track locations on said data sheet optically below the lenses of said lens sheet wherein data track locations are the locus of data bit locations which are spaced apart less than 10 microns.

3. The invention of claim 1 further comprising a plurality of data tracks on said data sheet optically below lenses of said lens sheet wherein said data tracks are comprised of data bits spaced apart less than 10 microns.

4. The invention of claim 3 wherein the data bits are less than 5 microns in diameter.

5. The invention of claim 1 further comrpising a hgihly specular light reflective reflector sheet overlying the surface of said data sheet remote from said lens sheet.

6. The invention of any of claims 1–5 wherein said data sheet is planar.

7. The invention of any of claims 1–5 wherein said lenses are aspherical.

8. The invention of any of claims 1–5 wherein said data sheet is formed to have a plurality of aligned and closely spaced curved surfaces.

9. The invention of any of claims 1–5 further described by said cylindrical lenses being spherical of uniform radius of curvature $r_1$ and said data sheet is formed to have a plurality of aligned and closely spaced spherical surfaces of uniform radius of curvature $r_2$.

10. The invention of claim 9 further described by said spherical lenses having optically corresponding data sheet spherical surfaces wherein the center of curvature of each said lens and its corresponding data sheet spherical surface is coincident.

11. The invention of any of claims 1–5 further described by said data sheet and said lenses forming a part of a disk and said lenses defining concentric circles about said disk center.

12. The invention of any of claims 1–5 further described by said data sheet and said lens sheet forming a part of a disk and said lenses defining a spiral about said disk center.

13. The invention of any of claims 1–5 further described by said data sheet and said lens sheet forming part of a disk and said lenses defining a plurality of closely spaced concentric spirals, non-continuous with each other, about said disk center.

14. The invention of any of claims 1–5 further described by said data sheet and said lens sheet forming part of a card and said lenses defining concentric arcs of circles.

15. The invention of any of claims 1–5 further described by said data sheet and said lens sheet forming part of a card and said lenses defining parallel straight lines.

16. The invention of claims 2–4 further comprising light source means providing a beam of parallel light the optical path of which includes a lens of said lens sheet; and source lens means disposed in the optical path of the light beam and operative to focus the beam toward a line perpendicular to the lens of said lens sheet which focuses the beam toward a point.

17. The optical data storage device of claim 16 further described by the focused point lying in said data sheet on a data track location.

18. The invention of claim 16 further providing means operable to vary the angle at which the light beam strikes the lens of said lens sheet.

19. The invention of claim 1 further comprising light source means providing a beam of parallel light;

a source cylindrical lens having a longitudinal axis and disposed in the optical path of a beam from said light source means and operable to focus said beam toward a line and onto a lens of said data lens sheet wherein the longitudinal axis of said source lens is disposed perpendicular to the longitudinal axis of said data lens in the beam's optical path.

20. The optical data storage device of claim 19 wherein siad light source means is further described as laser light source means operative to produce a laser beam of parallel light; and further comprises:

means operable to vary the angle at which a beam of parallel light from said laser light source means strikes a data lens.

21. The optical data storage device of either claim 19 or 20 further comprising means operable to shift the position of said light source means relative to said data sheet whereby a particulat lens sheet lens can be located to be in the optical path of light source beam.

22. The invention of claim 1 further comprising light source means including focus means for directing toward said lens sheet a beam of light which is in one direction converging toward a line transverse to the cylindrical data lens in the beam's optical path and which is in the perpendicular direction substantially parallel.

23. The invention of claim 22 wherein the light source means includes a source cylindrical lens through which the beam first passes, converging the beam in said one direction, said source cylindrical lens being fixed in position with respect to the light source means.

24. The invention of either claim 22 or 23, wherein the light source means comprises a laser light source.

25. Optical data storage apparatus for high density storage and high rate retrieval of digital information comprising in combination a data sheet for high density storage of optically readable digital information;

a light transmitting lens sheet overlying said data sheet and affixed thereto;

a plurality of aligned and closely spaced cylindrical data lenses formed in the surface of said lens sheet whereby parallel light pasing through said lens sheet is focused onto said data sheet;

light source means providing a beam of parallel light, the optical path of which includes a lens of said lens sheet;

source lens means disposed in the optical path of said light source between said light source means and the lens of said lens sheet and operative to focuse the beam toward a line which is perpendicular to the longitudinal axis of the lens in the optical path of said light source means.

26. The invention of claim 25 wherein said lens means is further described as a cylindrical lens having a longitudinal axis disposed perpendicular to the longitudinal axis of the lens sheet lens in the optical path.

27. The invention of either claim 25 or 26 wherein said light source means and said source lens means are fixed relative to one another.

28. The invention of either claim 25 or 26 further described by said data sheet and said lenses forming a part of a disk and said lenses defining concentric circles about said disk center.

29. The invention of either claim 25 or 26 further descrbied by said data sheet and said lens sheet forming a part of a disk and said lenses defining a spiral about said disk center.

30. The invention of either claim 25 or 26 further described by said data sheet and said lens sheet forming part of a disk and said lenses defining a plurality of closely spaced concentric spirals, non-continuous with each other, about said disk center.

31. The invention of either claim 25 or 26 further described by said data sheet and said lens sheet forming part of a card and said lenses defining concentric arcs of circles.

32. The invention of either claim 25 or 26 further described by said data sheet and said lens sheet forming part of a card and said lenses defining parallel straight lines.

33. In a high-density optical data storage and retrieval system, the improvement comprising,
- a data storage card having a data sheet for high-density storage of optically readable digital information;
- a light transmitting lens sheet overlying said data sheet and affixed thereto;
- a plurality of aligned and closely spaced cylindrical data lenses formed in the surface of said lens sheet whereby parallel light passing through said lens sheet is focused onto said data sheet and wherein siad data lenses form arcs of a circle;
- a rotatable disk having a center of rotation and adapted to receive and hold data cards and locate said cards such that the center of rotation of said disk is coincident with the center of curvature of said lenses.

34. An optical data storage system for high-density data storage the improvement comprising,
- a data storage card having a data sheet for high-density storage of optically readable digital information;
- a light transmitting lens sheet overlying said data sheet and affixed thereto;
- a plurality of parallel cylindrical lenses formed in the surface of said lens sheet whereby parallel light passign through said lens sheet is focused onto said data sheet;
- a card holding carrier adapted to receive data storage cards and which is moveable in a direction parallel to the length of the cylindrical lenses.

35. The invention of either claim 33 or 34 further comprising,
- light source means providing a beam of parallel light the optical path of which includes a lens of said lens sheet;
- source lens means disposed in the optical path of said light source means between said light source means and the lens of said lens sheet and operative to focus the beam toward a line which is perpendicular to the longitudinal axis of the lens in the optical path of said light source means.

36. The invention of claim 35 wherein said lens means is further descirbed as a cylindrical lens having a longitudinal axis disposed perpendicular to the longitudinal axis of the lens sheet lens in the optical path.

37. The invention of either claim 35 or 36 wherein said light source means and said source lens means are fixed relative to one another.

* * * * *